Patented Oct. 10, 1933

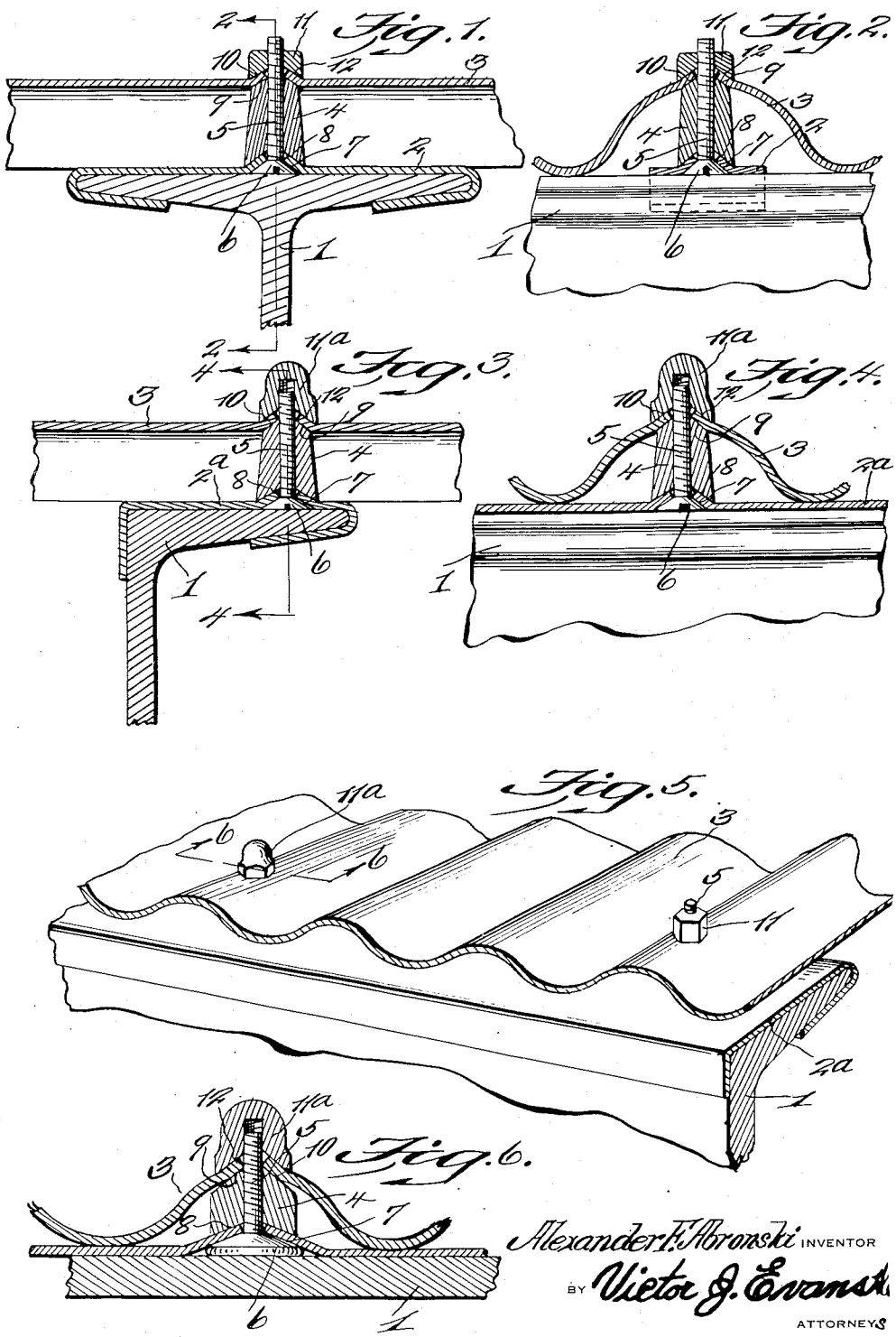

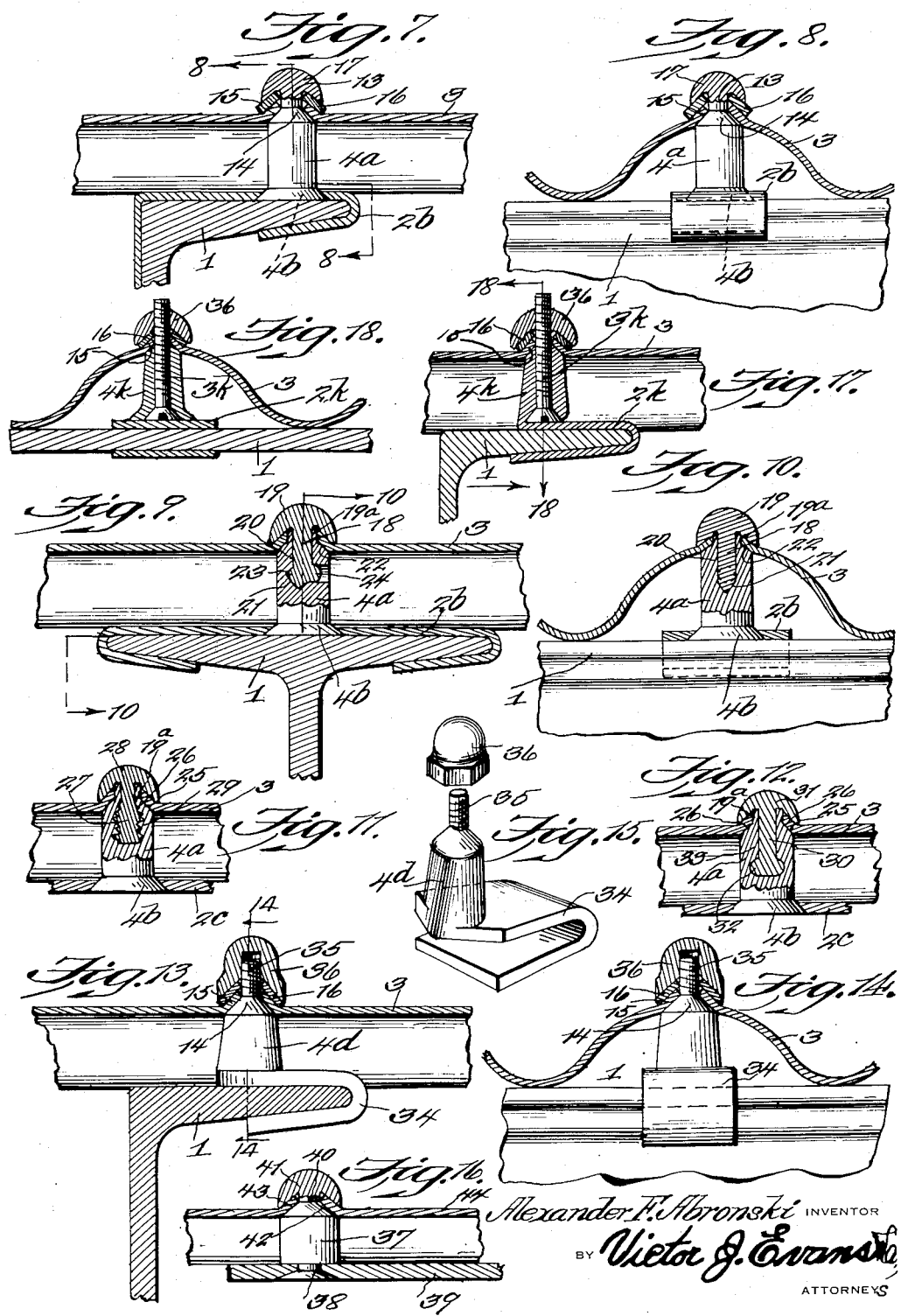

1,930,187

UNITED STATES PATENT OFFICE 1,930,187

RIVETING ANCHOR FOR FASTENING SHEET METAL

Alexander F. Abronski, Philadelphia, Pa.

Application May 18, 1931. Serial No. 538,288

3 Claims. (Cl. 189—35)

The present invention relates to an improved riveting hanger for fastening sheet metal and particularly of the corrugated type, and one of the purposes of the invention is to provide a hanger of this kind including means for mounting the hanger on a saddle or any other suitable support, which in turn may be mounted upon an angle girder or I-beam.

Another purpose is to provide a hanger, the extremity of which is conical or beveled where it engages with the sheet metal, the sheet metal being dished in conformity with the conical or beveled extremity, in combination with a fastening nut or riveted head likewise dished or countersunk where it engages with the sheet metal, thereby preventing leakage around the hanger, there being a shank, either carried by the riveted head or passing through the hanger for joining together the various elements.

Incidentally another purpose is to provide a hanger, wherein a shank supports the hanger, the head of the shank being countersunk in a saddle in order to insure a close fitting structure.

In this invention the main purpose is to form a countersink or a partial upset portion around a conical or beveled extremity of a hanger and in adjoining position to a holding shank, whereby a fastening opposite to the beveled or conical extremity of the hanger is provided to prevent leakage around the shank, and upon a careful inspection of the disclosure in this case it will be noted that the above named purpose is common throughout the various forms of the device.

A further purpose is to provide a shoulder or guard which acts as a cutting edge to allow same to be drawn into the sheet with a rivet set, the shoulder acts as a guard to hold the wall of the metal around the opening (through which the shank passes) to keep from enlarging the opening in the sheet when the rivet is driven closely in contact with adjacent parts. This is very necessary in case of soft sheets such as aluminum and copper.

It is to be understood that the particulars here-in given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a sectional view through a portion of an I-beam showing a clip and hanger connected thereto and a corrugated sheet fastened to the hanger.

Figure 2 is a sectional view on line 2—2 of Figure 1.

Figure 3 is a sectional view through a portion of an angle or channel beam, showing a saddle on the beam, the saddle supporting a hanger together with a corrugated metal sheet supported in the hanger.

Figure 4 is a sectional view on line 4—4 of Figure 3.

Figure 5 is a perspective view of a portion of an angle or channel beam showing a saddle thereon and a corrugated sheet operatively mounted on the saddle by means of hangers.

Figure 6 is a sectional view on line 6—6 of Figure 5.

Figure 7 is a sectional view through a portion of an angle or channel beam with a clip carried thereby, a hanger connected to the clip including a corrugated sheet supported on the hanger.

Figure 8 is a sectional view on line 8—8 of Figure 7.

Figure 9 is a sectional view showing a portion of an I-beam and clip mounted thereon, a hanger carried by the clip and a corrugated sheet riveted to the hanger.

Figure 10 is a sectional view on line 10—10 of Figure 9.

Figure 11 is a sectional view through a portion of a clip, showing a hanger with a corrugated sheet connected to the hanger and illustrating a modified construction of riveting device engaging within the hanger.

Figure 12 is a sectional view through a corrugated sheet and hanger, showing a modified construction of securing the riveted element to the hanger.

Figure 13 is a sectional view through a corrugated sheet illustrating a clip carried by an angle or channel beam, with the hanger integral with the clip, also showing a corrugated sheet fastened to the hanger.

Figure 14 is a sectional view on line 14—14 of Figure 13, but showing a modified construction of nut for the shank of the hanger.

Figure 15 is a detail perspective view of the clip and hanger shown in Figures 13 and 14.

Figure 16 is a detail sectional view showing still another modified form, wherein a shank is made integral with the hanger, the sheet metal being countersunk where it engages with the end of the hanger.

Figure 17 is a sectional view showing a clip and a hanger of another modified construction.

Figure 18 is a sectional view on line 18—18 of Figure 17.

Referring to the drawings, 1 identifies an I-beam, an angle iron or channel beam, and 2 a clip as in Figures 1 and 2, or 2a identifies a saddle as in Figures 3, 4 and 5, while 3 identifies a corrugated sheet. In Figures 1 to 5 inclusive a hanger 4 is provided, which is in the form of a sleeve like device, which is interposed between the corrugated sheet and the saddle. In Figures 7 to 12 the hanger 4a has a beveled head 4b, which is connected to a clip 2b as in Figures 7 to 10, or to a saddle such as 2c in Figures 11 and 12.

In Figures 1 to 6, inclusive, a threaded shank 5 including a head 6 passes through the sleeve hanger, the head 6 mounted in a depression or countersink 7 of the saddle, thereby insuring tight fitting of the structural parts.

The end of the hanger adjacent the saddle is formed with a countersink 8, which receives the wall of the countersink 7, further insuring tight fitting of the structural parts. The opposite end of the sleeve like hanger in Figures 1 to 6 inclusive terminates in a beveled or conical extremity 9, which enters a countersink 10 formed in the corrugated sheet. The wall of the countersink 10 fits against the beveled or conical extremity and around the shank 5, and threaded on the shank is a nut 11, such as shown in Figures 1 and 2 where the shank passes through the nut, and mounted on the shank in Figures 3, 4, 5, and 6 is a nut 11a, where the shank simply enters the nut but does not pass through it. The nuts 11 and 11a in Figures 1 and 2, and Figures 3, 4, 5, and 6 have countersinks 12, which receive the walls of the countersink or depressions 10 in Figures 1 to 6, thereby insuring a tight fitting structure, as well as rendering the parts leak proof.

Referring to Figures 7 and 8 it will be noted that the hanger 4a is solid and has a shank 13 extending from the conical or beveled extremity 14. The conical or beveled extremity engages in a depression or countersink 15 of the corrugated sheet, there being a washer 16, which, before the shank 13 is headed is fitted on the shank in its usual flat shape, and subsequently to the shank being riveted or headed as in Figures 7 and 8, the washer conforms to the conical contour of the wall of the countersink 15, the head 17 of the shank likewise conforming to the contour of the washer, thereby insuring a tight fitting of the associate parts, and in such a manner as to prevent leakage around the shank of the hanger.

In Figures 9 and 10 the shank 18 is a separate part to the hanger 4a. In fact the hanger in Figures 9 and 10 is formed with a bore 20 part way through the hanger, and the inner end of the bore is enlarged as shown at 21. In Figures 9 and 10 the shank also has the beveled or conical extremity 22, which enters the depression or countersink formed on the corrugated sheet, therefore when the shank 18 is fitted into the bore 20, and the end of the shank is headed as shown at 19 by any suitable means, such as a riveting tool or the like, the shank being of relatively soft metal will fill up the enlargement 21 in a manner as shown at 23 and thereby lock the shank to the hanger, so drawing the parts together as to insure tight fitting thereof as well as rendering them leak proof.

Also in Figures 9 and 10 as well as in Figures 11 and 12 the hanger 4a beyond its conical or beveled portion terminates in an extension guard or skirt or shoulder 19a, which acts as a cutting edge, adapted to be drawn through the sheet with a rivet set, said skirt, shoulder or extension acting to hold the wall of the metal around the opening (through which the shank passes) to keep from enlarging the opening in the sheet when the rivet is driven closely in contact with the adjacent parts.

In Figures 11 and 12 the shank 4a also has the conical or beveled extremity 25 to engage the countersink or depression 26 of the corrugated sheet. In Figure 11 a shank 27, when headed as shown at 28 fills up the irregular or deformed bore 29 of the hanger, while in Figure 12, a shank 30 when headed as at 31 fills up at 32 in the inner enlarged end of the bore 33 of the hanger, likewise making a tight fitting of the parts and preventing leakage.

In Figures 13 and 14 the hanger 4d is solid and made integral with the clip 34, while the shank 35 is threaded and constitutes an integral part of the hanger, a suitable nut 36 engaging with the shank to insure tight fitting of the elements and thereby preventing leakage.

As previously stated the idea of the hanger engaging a countersink or depression in the corrugated sheet constitutes a feature common to all forms of the construction.

In Figure 16 the hanger 37 is riveted as at 38 to the clip or other support 39, while its shank is made integral with the hanger, the shank 40 being headed at 41, in order to draw the beveled or conical extremity 42 of the hanger into the depression or countersink 43 of the corrugated sheet 44.

In Figures 17 and 18 the clips 2k carried by an I or angle beam 1 is constructed of any suitable metal which can be bent around a screw 3k, thereby providing a hanger 4k. Preferably aluminum, not too soft, just sufficient to allow it to be bent or hammered about a screw 3k is employed in order to form the hanger 4k, the head of the screw being anchored in the bottom of the hanger. Otherwise the corrugated sheet 3 is mounted on the hanger substantially the same as that in Figures 13 and 14. While the aluminum or other metal clip 2k may be hammered or formed around the screw 3k to construct the hanger, the relative arrangement of the parts are rigid enough to support the corrugated sheet 3.

The invention having been set forth, what is claimed is:

1. In an anchor for fastening sheet metal which is provided with a countersink, a supporting element mounted on a girder, a hanger rigidly carried by the element, one end of the hanger having a conical extremity engaged into the countersink, the conical extremity provided with an extension engaged through the bottom of the countersink, a shank irremovably anchored within the hanger and extending beyond the top surface of the wall of the countersink and beyond said extension, and means carried by the extended part of the shank and being swaged over and in contact with the top surface of the countersink, thereby drawing the attendant portions of such engaged associated elements in close contact.

2. In an anchor for fastening sheet metal which is provided with a countersink, a supporting element for mounting on a girder, a hanger carried by the element, one end of the hanger having a conical extremity engaged into the countersink, said hanger having an irregular or deformed bore, a shank of soft metal within the bore and extending beyond the top surface of the wall of the countersink, the extended part of the shank being swaged over and in contact with the top surface of the countersink, the lower end of the shank be swelled to fill up the irregular or deformed bore when the extended part of the shank is being swaged over, thereby drawing attendant portions of such engaged associated elements in close contact.

3. In an anchor for fastening sheet metal which is provided with a countersink, a supporting element for mounting on a girder, a hanger carried by the element, one end of the hanger having a conical extremity engaged into the countersink and having an extended sleeve passing through the bottom of the countersink, said hanger having an irregular or deformed bore, a shank of soft metal within the bore and extending beyond the top surface of the wall of the countersink, the extended part of the shank being swaged over and in contact with the top surface of the countersink, the lower end of the shank being swelled to fill up the irregular or deformed bore when the extended part of the shank is being swaged over, thereby drawing the attendant portions of such engaged associated elements in close contact.

ALEXANDER F. ABRONSKI.